INVENTOR
Teresa Stevenson
BY
Howard P. King
ATTORNEY

July 17, 1951 T. STEVENSON 2,560,668
PISTON RING
Filed Sept. 2, 1949 2 Sheets-Sheet 2
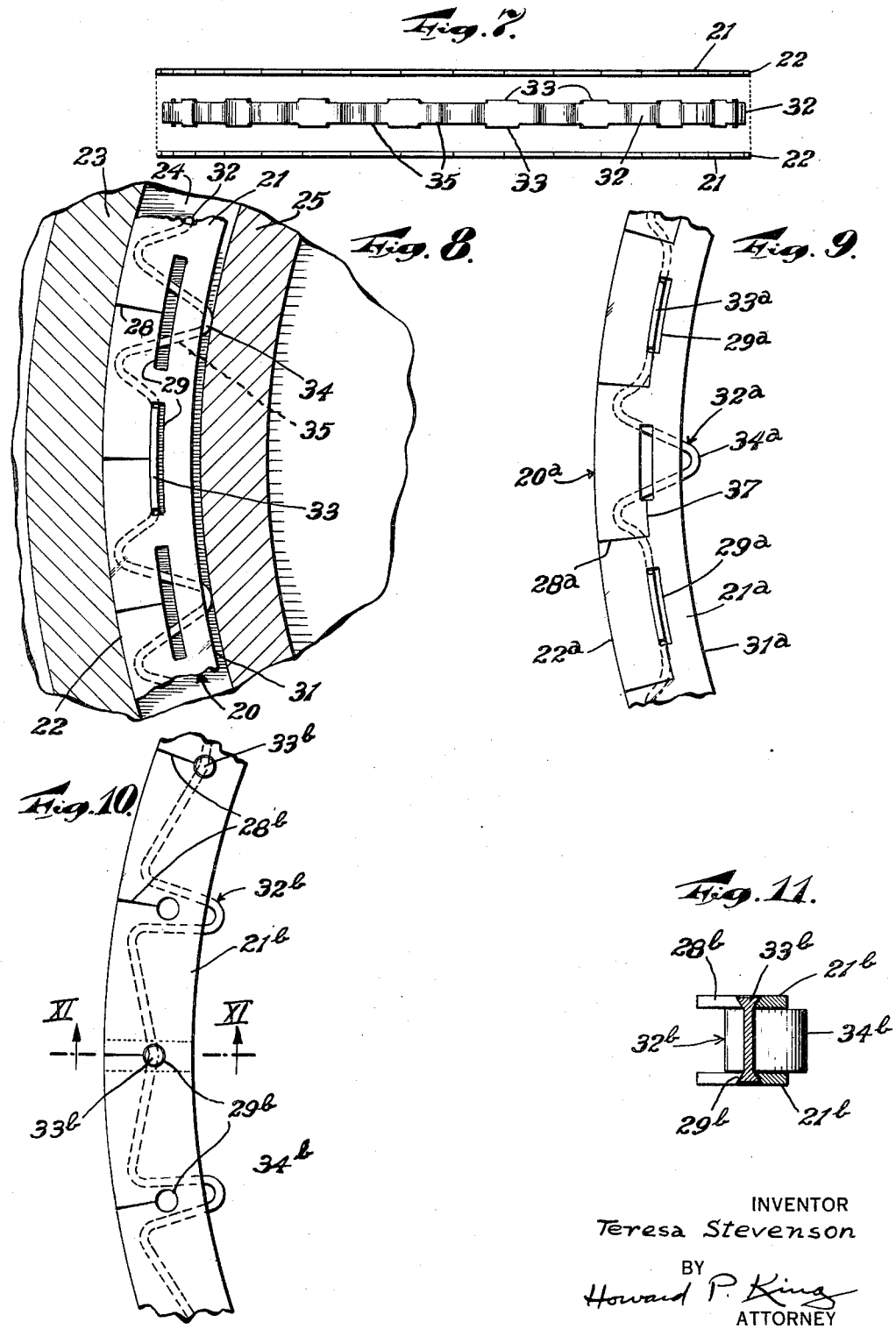
INVENTOR
Teresa Stevenson
BY
Howard P. King
ATTORNEY Patented July 17, 1951

2,560,668

UNITED STATES PATENT OFFICE 2,560,668

PISTON RING

Teresa Stevenson, Summit, N. J.

Application September 2, 1949, Serial No. 113,733

12 Claims. (Cl. 309—45)

This invention relates to pistons, and more particularly to rings adapted to function for the conservation of oil, and is an improvement over the rings of my prior application Serial Number 92,031 filed May 7, 1949.

The principal object of my invention, generally considered, is to provide an improved light oil ring formed to efficiently scrape oil from a cylinder in which it operates, and return it to the crank case or other oil reservoir of the machine in which used.

Another object of my invention is to provide a composite or built-up oil control ring for use with a piston, and so formed that it not only provides a plurality of oil-scraping edges for more efficiently conserving oil, but also provides efficient means, in addition to the resiliency of the scraping portions, for holding said portions in close engagement with the cylinder wall.

A further object of my invention is to provide an oil control ring consisting of two oil-scraping portions which directly engage an associated cylinder, and of their own resiliency tend to hug the wall thereof, and a resilient retainer therebetween with portions projecting inwardly beyond the inner peripheral edge of said rings into engagement with the piston itself, and other portions engaging apertures between the inner and outer peripheral edges of said rings so as to provide additional resilient forces holding said rings in engagement with the associated cylinder.

A still further object of my invention is to provide an oil control ring for use in a piston groove comprising thin resilient rings which directly engage the inner surface of a cylinder with which used, and a resilient retainer for said rings having interlocking means therewith and resilient elements between said means engaging the inner surface of the ring groove, in which received, so as to exert resilient pressure outwardly on the associated rings.

Another object of my invention is to provide an oil control ring of great flexibility which is capable of conforming to cylinders, even though they may be out of round, or have irregularities or local distortions.

A further object of my invention is to provide a light piston ring which can be economically made from sheet and strip material, such as high carbon steel, and which can be heat treated and hardened.

Yet another object of my invention is to provide a light, composite, oil-control ring, including a resilient retainer which is separately manufactured from the portions of the ring that provide the cylinder engagement surfaces, whereby said surfaces may be processed differently from said retainer.

Other objects of the invention will appear to those skilled in the art to which it appertains as the description proceeds, both by direct reference thereto and by implication from the context.

Referring to the accompanying drawings, in which like numerals of reference indicate similar parts throughout the several views;

Figure 7 is a view corresponding to Fig. 2, but showing the parts of the ring separated from one another;

Figure 8 is an enlarged fragmentary sectional view on line VIII—VIII of Fig. 6, looking in the direction indicated by the arrows, the piston ring, however, being shown in elevation.

Figure 9 is a view corresponding to Fig. 3, but showing a modification;

Figure 10 is a view corresponding to Fig. 9, but showing an additional embodiment of the invention; and Figure 11 is a sectional view on line XI—XI of Figure 10.

Figure 6:
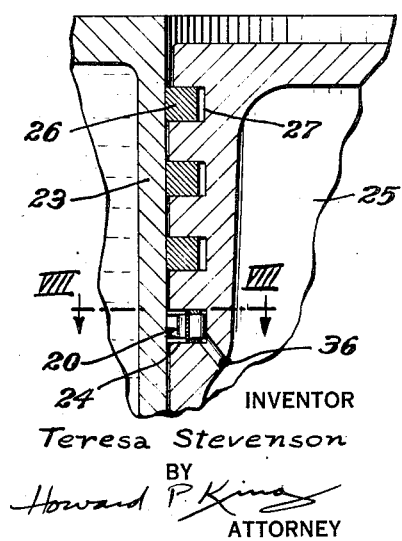
Figure 6 is a fragmentary axial sectional view of a portion of a cylinder and associated piston having an oil control ring embodying my invention applied in one of the piston-ring grooves of the piston.

In the specific embodiment of the invention illustrated in said drawings, and with reference initially to the form thereof shown in Figures 1 to 8 inclusive, the composite piston ring 20 comprises three parts, of which two are oil-scraping members 21, the outer peripheral edges 22 of which directly engage the inner surface of a cylinder 23, when applied in the piston-ring groove 24 of the piston 25 illustrated in Figures 6 and 8.

Each member or ring 21 is similar, in some respects, to an ordinary expanding piston ring 26 such as shown in other piston ring grooves 27 of the piston 25, except notably that it is much thinner or narrower axially, and is by preference constructed of sheet steel or other sheet metal, as desired. Each member or ring 21 has its resiliency or flexibility in the plane of the ring or transverse plane of the associated piston 25, further increased by being formed with weakening radial slits 28 each of which preferably extends from the outer periphery 22 of the ring (although they may alternatively extend from the inner periphery, as in the embodiment of Fig. 12) to an aperture which is shown in Figures 1 to 8 to be a circumferentially extending slot 29, thereby making the ring almost as easy to bend to a smaller diameter as if it had a radial width only equal to the width between slot 29 and the inner peripheral edge 31 of the ring. The slits 28 preferably extend to the central or mid-length portion of a slot, the several slots being shown uniformly spaced in an annular series between the inner and outer circumferences of each member or ring 21, as clearly indicated in Figs. 1 and 3.

Interposed between the pair of members or rings 21, is a sinuous resilient retainer member 32, which has lateral engagement with the said members and functions to augment the inherent outward pressure which each ring exerts on the associated cylinder 23, as well as to supply forces at uniformly spaced intervals around the circumference of each member or ring to hold that member in the desired resilient engagement with the associated cylinder. Lateral engagement of the retainer with the members 21 is accomplished by means of series of tongues on the edges of said retainer, the tongues of each series projecting toward the adjacent member and into every other slot 29 in such adjacent member or ring 21, as illustrated in Fig. 7. The portions of the retainer from which the tongues project, are substantially flat or slightly curved to register with the slots in the members 21, whereas the portions of the retainers between the tongue-carrying portions are bent in a sinuous manner, as clearly shown in Fig. 3, first outwardly and then inwardly to provide an inwardly extending loop 34 the apex of which normally projects beyond the inner periphery 31 of the rings 21, so that when the assembled ring device 20 is fitted in a piston-ring groove, as shown in Fig. 6, these apices or peaks of the loops 34 will engage the bottom surface of the groove, from whence the sinuous portions exert outward pressure to and through the tongues 33 onto the slot walls and members 21 which are thereby held in firm engagement with the inner surface of the cylinder wall.

It may well be queried why the rings or members 21 are formed with twice as many slots 29 as are necessary for the reception of the tongues 33 of the retainer 32. The reason for this is that by so doing the rings are made more uniformly flexible in their planes, and additionally, if the retainer 32 breaks before the rings 21 are worn out, a new retainer may be inserted using the hitherto unused and therefore unworn slots, whereby the tongues 33 will have snug engagement in said unworn slots, preventing undue displacement between the retainer, or portions thereof, and the associated rings 21.

Figure 1:
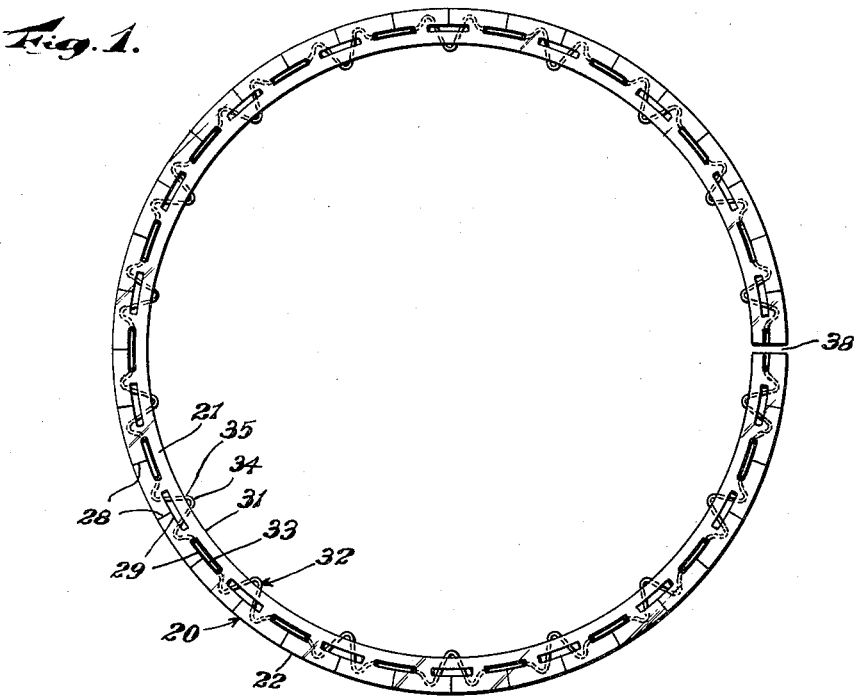
Figure 1 is an axial view of a composite oil control ring embodying my invention.
Figure 2:
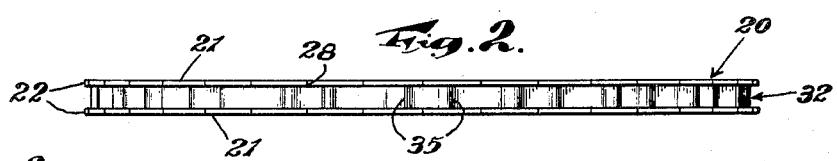
Figure 2 is an edge view of the ring of Fig. 1.
Figure 3:
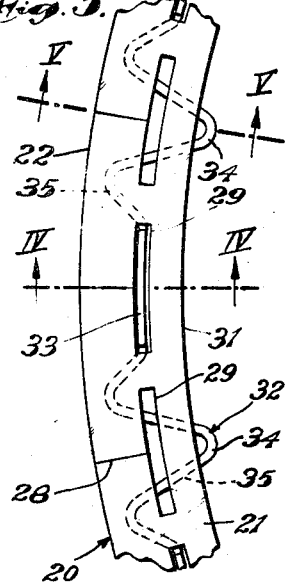
Figure 3 is an enlarged fragmentary view of a portion of the ring as shown in Fig. 1.
Figure 4:
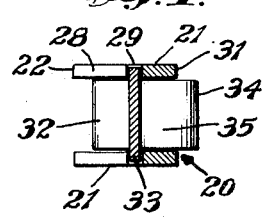
Figure 4 is a sectional view on the line IV—IV of Fig. 3, looking in the direction indicated by the arrows.
Figure 5:
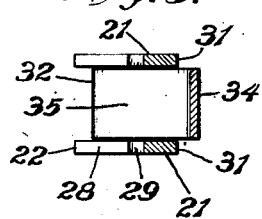
Figure 5 is a sectional view on the line V—V of Fig. 3, looking in the direction indicated by the arrows.

When my improved oil-control ring or device is used with a piston, as illustrated in Figs. 6 and 8, the engagement with the bottom of the groove in the piston causes displacement of the retainer 32 from the position of Fig. 3 to that of Fig. 8, thereby resulting in each sinuous section 35 between tongues exerting its outward pressure on the adjacent sections or segments of the associated members or rings 21, causing expansion of the said members into engagement with the cylinder. Such expansion results in slight opening of the slits, as shown in Fig. 8, but such opening is not enough to appreciably affect the oil-conserving action of the ring device. The bottom of the ring receiving groove 24 of the piston has a series of drain ports 36 for returning oil collected in said groove back to the reservoir (not shown) through the piston wall and open bottom of the piston.

In Fig. 9, I show a built-up oil-control ring device 20$^a$ comprising a pair of ring members 21$^a$, with slots 29$^a$ like the slots 29 of the first-described embodiment. In the present instance, however, the slits 28$^a$ are not on the same radius as the centers of corresponding slots 29$^a$, but each slit instead starts from the outer periphery 22$^a$, as illustrated, on a radius between a pair of slots, and then is projected circumferentially, one way or the other, to an end of a slot 29$^a$, as indicated at 37. This means that when the retainer 32$^a$, which may correspond with the retainer 32 of the preceding embodiment, acts outwardly through its tongues 33$^a$ on correspondingly slotted portions of the ring 21$^a$ not only do the radial slit portions open slightly, but also the continuing slit portions 37.

In the embodiment of Figs. 10 and 11, a construction generally corresponding with that of Figs. 1 to 8 inclusive is illustrated, except that instead of having wide tongues and slots, the retainer member 32$^b$ has narrow tongues 33$^b$ of the form of pintles, and the rings or members 21$^b$ have holes or apertures of adequate size to receive and substantially fit the pintles or tongues. These holes or apertures are, however, preferably outwardly flaring so that after assembly of the ring members and retainer, the ends of the pintles projecting out of the flaring holes may be upset, swaged or riveted and made flush with the outer flat face of the ring. After assembly, therefore, the retainer actually holds the members or rings 21$^b$ against axial separation and in normally assembled relationship even when not received in the groove of the piston.

Operation of the structure of Figs. 10 and 11 is substantially the same as that of the first embodiment, in that the apices or extreme inner portions or knees of 34$^b$ of the resilient retainer, desirably shaped as illustrated in Fig. 10, are forced outwardly by engagement with the bottom surface of the associated piston groove, thereby transferring corresponding pressure to the associated rings 21$^b$ through the pintle-like tongues 33$^b$.

It will be understood that as an alternative, these pintle-like tongues may be formed on separate bolt or rivet members connecting the rings 21$^b$, with the outer surface of the retainer 32$^b$ pressing directly against intermediate portions of said bolts or rivets. As in the first embodiment, slits 28$^b$ are provided in each ring 21$^b$, and extend from the outer periphery to the aperture 29$^b$ which receives the pintles as well as to the corresponding unused apertures disposed between the used ones.

From the foregoing disclosure, it will be seen that I have invented a composite ring particularly adapted for conserving oil in pistons of internal combustion or other engines and pumps, whereby in the space formerly occupied by a single oil-control ring, I have provided not only a pair of rings or members, but insure that their cylinder-engaging edges are pressed into tight contact with the inner surface of the associated cylinder, even though the cylinder surface may be out-of-round or irregular. This action occurs because of the extreme flexibility provided by the radial slitting of the rings and the use of the resilient retainer which presses outwardly at uniformly spaced points around the whole periphery which makes tongue engagement with the rings or members.

Although selected preferred embodiments of my invention have been disclosed, it will be understood that modifications may be made within the spirit and scope of the appended claims.

I claim:

1. A piston ring comprising a pair of oil-scraping split-ring annular members each having a series of circumferentially spaced slits each partially severing the ring member to facilitate bending of the member in the plane of the member, and each member having a corresponding circular series of apertures spaced from one another in a circumferential direction and spaced from and located between the inner and outer peripheries of said members, said slits in each member extending from one periphery and each to a different one of said apertures, the sides of each slit being in closed contact for deterring entry of oil through the slit to the aperture, and a resilient spacer between said members, said spacer having member-engaging means projecting laterally from the spacer at locations thereon corresponding to alternate apertures in the members and engaged only in said alternate apertures, said spacer having means between said projecting means extending transversely of the members and normally protruding past the inner peripheries of said members and thereby adapted to engage the bottom of a ring-receiving piston groove in use as an abutment from which outward pressure will be applied to said spacer and its member-engaging means and member.

2. A piston ring device comprising a pair of thin oil-scraping slit ring members, each having a series of circumferentially spaced slits to facilitate bending in its plane and a corresponding series of apertures circumferentially spaced from one another and to which said slits respectively extend in radial directions, and a resilient retainer between said pair of ring members and provided with means fitting said apertures and portions between the aperture-fitting means bent inwardly so as to engage the bottom surface of the ring members defining a receiving piston-ring groove as an abutment from which the aperture-fitting means can exert outward pressure on the associated oil-scraping members.

3. A piston ring device comprising a pair of thin oil-scraping split ring members, each having a series of apertures circumferentially spaced from one another and a series of normally closed slits spaced to correspond with said apertures and extending thereto, to facilitate bending of each ring member in its plane, and a resilient retainer between said ring members and provided with means fitting alternate apertures, and portions between the aperture-fitting means bent inwardly so as to engage the bottom surface of the ring members defining a receiving piston-ring groove as an abutment from which the aperture-fitting means can exert outward pressure on the associated oil-scraping members.

4. A piston ring device comprising a pair of thin oil-scraping ring members, each having a single split for rendering the member expandable, each having a series of circumferentially spaced slits in its cylinder-engageable periphery to facilitate bending in its plane and a corresponding series of slots extending circumferentially and circumferentially spaced from one another, said slits extending to the slots and the inner peripheries of the members being continuous except for the split, and a resilient retainer between said pairs of ring members and formed with tongues fitting said slots, and portions between the tongue-carrying parts bent inwardly so as to engage the bottom surface of the ring members defining a receiving piston-ring groove, as an abutment from which the tongues can exert outward pressure on the associated oil-scraping members.

5. A piston ring device comprising a pair of thin oil-scraping split ring members, each having a series of circumferentially spaced slits in its cylinder-engageable periphery to facilitate bending in its plane and a corresponding series of slots extending circumferentially and circumferentially spaced from one another, said slits being at least in part radial and respectively extending to said slots, and a resilient retainer between said pairs of ring members and formed with tongues fitting said slots and portions between the tongue-carrying portions bent inwardly so as to engage the bottom surface of the ring members defining a receiving piston-ring groove as an abutment from which the tongues can exert outward pressure on the associated oil-scraping members.

6. A piston ring device comprising a pair of thin oil-scraping split ring members, each having a series of circumferentially spaced slits in its cylinder-engageable periphery to facilitate bending in its plane and a corresponding series of slots extending circumferentially and circumferentially spaced from one another, said splits being spaced to correspond with said slots and extending thereto, and a resilient retainer between said rings and provided with tongues fitting alternate slots, and portions between the tongue-carrying portions bent inwardly so as to engage the bottom surface of the ring members defining a receiving piston-ring groove as an abutment from which the tongues can exert outward pressure on the associated oil-scraping members.

7. A piston ring device comprising a pair of thin oil-scraping split ring members, each having a series of circumferentially spaced slits in its periphery to facilitate bending in its plane and a corresponding series of apertures circumferentially spaced from one another and to which said slits respectively extend in radial directions, and a resilient retainer between and for the greater part of its length in supporting engagement with said pair of ring members and provided with means fitting said apertures, and portions between said aperture-fitting means bent inwardly so as to engage the bottom surface of the ring members defining a piston-ring groove as an abutment from which the aperture-fitting means can exert outward pressure on the associated oil-scraping members.

8. In combination, a cylinder, a piston therein, a ring-groove in said piston, a pair of thin expanding oil-scraping split ring members, each having a series of circumferentially spaced slits to facilitate bending in its plane and a corresponding series of apertures circumferentially spaced from one another, said slits extending to the apertures and the sides of each slit being in closed contact, and means for increasing the engagement pressure between said ring members and the inner surface of said cylinder, the last said means comprising a resilient retainer between said pair of ring members provided with means fitting alternate ones of said apertures and portions between the aperture-fitting means bent inwardly beyond the inner periphery of said ring members into engagement with the bottom surface of the ring members defining said groove, from which the aperture fitting means exert outward resilient pressure on the associated oil-scraping members.

9. A piston ring device in accordance with claim 2 wherein said apertures comprise slots elongated in a direction circumferentially of the device, and wherein the aperture-fitting means comprises a tongue having a width longitudinally of the retainer substantially as long as said slot.

10. A piston ring device in accordance with claim 2 wherein the ring members and retainer are separable from each other and held assembled only by confinement in a piston-ring groove.

11. A piston ring device in accordance with claim 2 wherein the said apertures have substantially equal dimensions in transverse directions, and wherein the aperture-fitting means comprises pintles likewise having substantially equal dimensions in transverse directions.

12. A piston ring device in accordance with claim 2 wherein the ring members are riveted and thereby held assembled.

TERESA STEVENSON.

REFERENCES CITED

The following references are of record in the file of this patent:

UNITED STATES PATENTS

| Number | Name | Date |
|---|---|---|
| 1,378,894 | Norman | May 24, 1921 |
| 2,038,515 | Marien | Apr. 21, 1936 |
| 2,111,291 | Mason | Mar. 15, 1938 |
| 2,236,721 | Teetor | Apr. 1, 1941 |
| 2,239,376 | Smith | Apr. 22, 1941 |
| 2,262,311 | Zahodiakin | Nov. 11, 1941 |
| 2,317,637 | Phillips | Apr. 27, 1943 |
| 2,319,098 | Zahodiakin | May 11, 1943 |